(12) United States Patent
Llewellyn

(10) Patent No.: US 9,647,546 B2
(45) Date of Patent: May 9, 2017

(54) DUAL-MODE VOLTAGE DOUBLING BUCK CONVERTER WITH SMOOTH MODE TRANSITION

(71) Applicant: Fairchild Semiconductor Corporation, San Jose, CA (US)

(72) Inventor: William D. Llewellyn, San Jose, CA (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 146 days.

(21) Appl. No.: 14/560,630

(22) Filed: Dec. 4, 2014

(65) Prior Publication Data
US 2015/0162834 A1    Jun. 11, 2015

Related U.S. Application Data

(60) Provisional application No. 61/912,372, filed on Dec. 5, 2013.

(51) Int. Cl.
*H02M 3/07* (2006.01)
*H02M 3/158* (2006.01)
*H02M 1/00* (2006.01)

(52) U.S. Cl.
CPC ............ *H02M 3/158* (2013.01); *H02M 3/07* (2013.01); *H02M 2001/007* (2013.01); *H02M 2001/0022* (2013.01); *H02M 2001/0025* (2013.01)

(58) Field of Classification Search
CPC .................. H02M 3/158; H02M 3/07; H02M 2001/0025; H02M 2001/007; H02M 2001/0022

USPC .................................................. 323/266–272
See application file for complete search history.

(56) References Cited

U.S. PATENT DOCUMENTS

| | | | | |
|---|---|---|---|---|
| 6,528,976 | B1* | 3/2003 | Lenk | H02M 3/1588 323/224 |
| 7,176,665 | B2* | 2/2007 | Knoedgen | H02M 3/156 323/271 |
| 7,432,689 | B2* | 10/2008 | Miller | H02M 3/1582 323/225 |
| 7,518,346 | B2 | 4/2009 | Prexl et al. | |

(Continued)

OTHER PUBLICATIONS

Search report from STIC EIC 2800 searcher John Digeronimo.*

(Continued)

*Primary Examiner* — Timothy J Dole
*Assistant Examiner* — Htet Z Kyaw
(74) *Attorney, Agent, or Firm* — Grossman Tucker Perreault & Pfleger PLLC

(57) ABSTRACT

Devices and methods provide a voltage regulating device including voltage supply circuitry configured to receive a first voltage, generate at least a second voltage based on the first voltage, and output an output voltage, the output voltage being one of the first voltage and the second voltage based on a voltage selection signal; regulator circuitry configured to switch between the output voltage and a reference potential based on a control signal; and control circuitry configured to generate the control signal, the control signal having a first duty cycle if the output voltage is the first voltage and a second duty cycle if the output voltage is the second voltage, the control circuitry configured to adjust the second duty cycle based on, at least in part, a droop voltage in the regulator circuitry.

18 Claims, 5 Drawing Sheets

(56) References Cited

U.S. PATENT DOCUMENTS

| | | | |
|---|---|---|---|
| 7,919,952 B1* | 4/2011 | Fahrenbruch | H02M 3/156 323/222 |
| 8,018,212 B1* | 9/2011 | Petricek | H02M 3/1582 323/259 |
| 8,436,591 B2 | 5/2013 | Dearn | |
| 8,773,084 B2 | 7/2014 | Casey et al. | |
| 9,110,482 B2* | 8/2015 | Kuo | G05F 3/08 |
| 2004/0130304 A1* | 7/2004 | Lanni | G05F 1/56 323/282 |
| 2004/0263231 A1* | 12/2004 | Trafton | H02M 3/073 327/327 |
| 2006/0022653 A1* | 2/2006 | Reed | H02M 3/158 323/282 |
| 2011/0043172 A1 | 2/2011 | Dearn | |
| 2011/0074468 A1* | 3/2011 | Hsu | G06F 1/08 327/101 |
| 2011/0101938 A1* | 5/2011 | Ma | H02M 3/07 323/282 |
| 2012/0049936 A1* | 3/2012 | Adkins | H02M 3/07 327/536 |
| 2013/0021015 A1* | 1/2013 | Moussaoui | H02M 3/1582 323/311 |
| 2013/0113526 A1* | 5/2013 | Matsuoka | H03K 17/163 327/109 |
| 2013/0300392 A1* | 11/2013 | Laur | H02M 3/156 323/284 |
| 2015/0145497 A1* | 5/2015 | Torres | H02M 3/158 323/283 |
| 2015/0222183 A1* | 8/2015 | Karlsson | H02M 3/156 323/271 |
| 2015/0256078 A1* | 9/2015 | Tanabe | H02M 3/1582 323/271 |

OTHER PUBLICATIONS

Ping-Ching Huang, et al., High Efficiency and Smooth Transition Buck-Boost Converter for Extending Battery Life in Portable Devices, 2009, IEEE, 978-1-4244-2893-9/09, 4 pages.

Young-Joo Lee, et al., A Compensation Technique for Smooth Transitions in Non-inverting Buck-Boost Converter, 2009, IEEE, 978-1-422-2812-0/09, 7 pages.

Yanzhao Ma, et al., A Novel Method for Smooth Transition in Step-Up/Step-Down DC-DC Converter, 2009, IEEE, 978-1-4244-4298-0/09, 4 pages.

Kian-Fu Wong, et al., A Completely Smooth Transition Buck-Boost Converter with Continuity-Mode (CM) Technique for Only Using 2 Switches in Whole Battery Life, Dec. 5-8, 2011, IEEE PEDS 2011, Singapore, 978-1-4577-0001-9/11, 4 pages.

* cited by examiner

DUAL-MODE VOLTAGE DOUBLING BUCK CONVERTER WITH SMOOTH MODE TRANSITION

CROSS REFERENCE TO RELATED APPLICATIONS

This application claims the benefit of U.S. provisional patent application Ser. No. 61/912,372 filed Dec. 5, 2013, which is incorporated fully herein by reference.

FIELD

The present disclosure relates to multiple-mode voltage multiplying buck converters, and more particularly, to dual-mode voltage doubling buck converters with a smooth mode transition.

BACKGROUND

Power converters can be used to convert a first voltage to a second voltage that may be higher or lower than the first voltage at different times. To compensate for variations in the first voltage, power converters may include two separate stages. The first stage receives the first voltage, generates an intermediate voltage based on the first voltage, and either outputs the first voltage or the intermediate voltage as an input voltage to the second stage, depending on the first voltage and the desired second voltage. The second stage then regulates that input voltage to generate a second voltage as the output. However, due to variations in the intermediate voltage, the second voltage may include distortion or vary from expected results.

BRIEF DESCRIPTION OF THE DRAWINGS

Features and advantages of the claimed subject matter will be apparent from the following detailed description of some example embodiments consistent therewith, which description should be considered with reference to the accompanying drawings, wherein:

Although the following Detailed Description will proceed with reference being made to some illustrative example embodiments, many alternatives, modifications, and variations thereof will be apparent to those skilled in the art.

DETAILED DESCRIPTION

Generally, the present disclosure provides devices and/or methods for converting and regulating an output voltage during a transition from a first mode, wherein the output voltage is equal to a supply voltage, and a second mode, wherein the output voltage is a multiple of the supply voltage.

Figure 1:
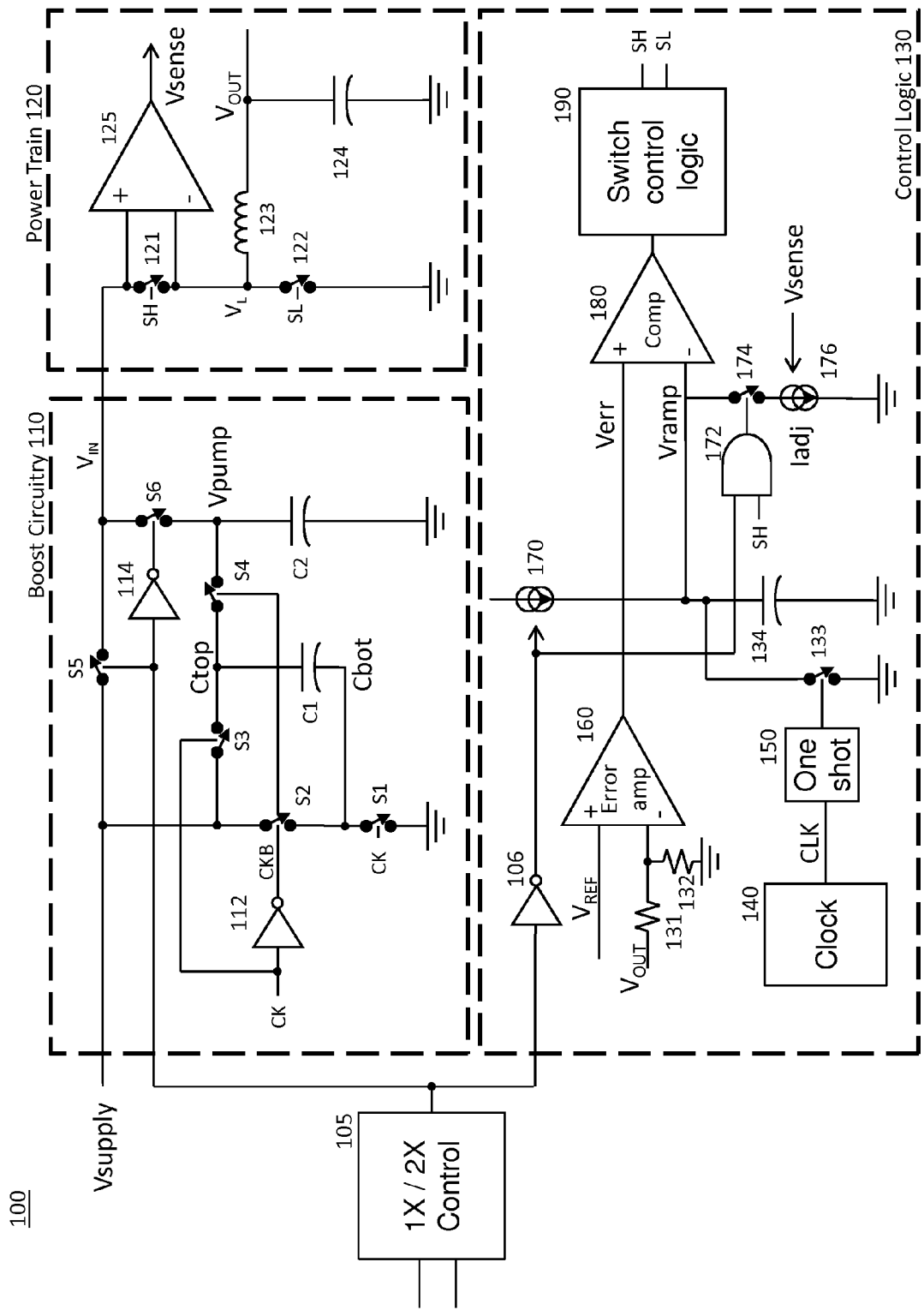
FIG. 1 illustrates a dual-mode voltage doubling buck regulator according to some example embodiments.

FIG. 1 illustrates a dual-mode voltage doubling buck regulator 100 according to some example embodiments. The buck regulator 100 includes 1X/2X control circuitry 105, an inverter 106, boost circuitry 110, power train circuitry 120 and control logic circuitry 130.

The buck regulator 100 may be configured to generate a stable output voltage $V_{OUT}$ based on at least one voltage source, such as supply voltage Vsupply. The supply voltage Vsupply may vary with regard to the output voltage $V_{OUT}$, such that the supply voltage Vsupply is higher or lower than the output voltage $V_{OUT}$ at any given time. To compensate for this, the 1X/2X control circuitry 105 may be configured to determine if the supply voltage Vsupply is higher or lower than the output voltage $V_{OUT}$ and may output a signal selecting a 1X mode or a 2X mode based on this determination. For example, if the supply voltage Vsupply is higher than the output voltage $V_{OUT}$, the boost circuitry 110 may output the supply voltage Vsupply as the input voltage $V_{IN}$ to the power train 120 in the 1X mode. If the supply voltage Vsupply is lower than the output voltage $V_{OUT}$, the boost circuitry 110 may generate a pump voltage Vpump that is higher than the output voltage $V_{OUT}$ and output the pump voltage Vpump as the input voltage $V_{IN}$ to the power train 120 in the 2X mode.

As the input voltage $V_{IN}$ may be higher than the output voltage $V_{OUT}$, the power train 120 may be configured to switch between coupling the output voltage $V_{OUT}$ to the input voltage $V_{IN}$ and coupling the output voltage $V_{OUT}$ to a reference potential (e.g. ground). A percentage of time that the output voltage $V_{OUT}$ is coupled to the input voltage $V_{IN}$ relative to a total period or clock cycle is a duty cycle of the power train 120. This duty cycle can be expressed as a variable between 0 and 1, with a 0 indicating that the power train 120 couples the output voltage $V_{OUT}$ to the reference potential for the entire period and a 1 indicating that the power train 120 couples the output voltage $V_{OUT}$ to the input voltage $V_{IN}$ for the entire period. The duty cycle of the power train 120 may be controlled by the control logic 130.

As discussed above, the boost circuitry 110 may be configured to output the supply voltage Vsupply or the pump voltage Vpump based on the signal from the 1X/2X control circuitry 105. In some embodiments, the boost circuitry 110 may include additional voltage sources in addition to the supply voltage Vsupply, as the additional voltage sources may generate a more precise voltage for the input voltage $V_{IN}$ and may maintain the precise voltage regardless of load attached to the power train 120 or fluctuations in an output current. To avoid complexity and space constraints, however, the boost circuitry 110 illustrated in FIG. 1 includes only a single voltage source, the supply voltage Vsupply. If the supply voltage Vsupply is less than the output voltage $V_{OUT}$, the boost circuitry 110 may generate additional voltages that may be based on multiples of the supply voltage Vsupply. For example, the boost circuitry 110 illustrated in FIG. 1 may generate the pump voltage Vpump, which is intended to be double the supply voltage Vsupply. However, example embodiments may vary and the voltages are not limited thereto. For example, the boost circuitry 110 may generate different voltages or additional voltages such that the input voltage $V_{IN}$ may be selected from amongst three or more voltages. Moreover, the 1X/2X control circuitry 105 may signal that the input voltage $V_{IN}$ be any multiple or fraction of the supply voltage Vsupply without departing from the example embodiments.

To generate the pump voltage Vpump, the boost circuitry 110 may charge a first capacitor C1 to the supply voltage Vsupply and then charge a second capacitor C2 to a sum of a voltage across the first capacitor C1 and the supply voltage Vsupply. For example, the boost circuitry 110 may configure switches S1, S2, S3 and S4 to charge the first capacitor C1 using the supply voltage Vsupply during a high clock signal. During a low clock signal, the boost circuitry 110 may configure the switches S1, S2, S3 and S4 to place the first capacitor C1 in series with the supply voltage Vsupply, charging the second capacitor C2 to approximately twice the supply voltage Vsupply. The clock signal (CK and its complement CKB) may continuously run at a frequency sufficient to nominally maintain twice the supply voltage at Vpump (Vpump=2*Vsupply). Thus, depending on the signal from the 1X/2X control circuitry 105, the boost circuitry 110 may either output the supply voltage Vsupply via switch S5 in the 1X mode or the pump voltage Vpump via switch S6 in the 2X mode as the input voltage $V_{IN}$ to the power train circuitry 120. Example embodiments may vary, however, and the boost circuitry 110 may include any number of switches or capacitors to generate the pump voltage Vpump.

The power train circuitry 120 may include a high switch 121 and a low switch 122. The power train circuitry 120 may operate in one of two states a majority of the time, a first state and a second state. In the first state, the high switch 121 is closed (conducting) and the low switch 122 is open (not conducting), so that the output voltage $V_{OUT}$ is coupled to the input voltage $V_{IN}$ via the high switch 121. In the second state, the high switch 121 is open (not conducting) and the low switch 122 is closed (conducting), so that the output voltage $V_{OUT}$ is coupled to a reference potential (e.g. ground) via the low switch 122. Based on a clock frequency, the duty cycle of the power train circuitry 120 may be the percentage of time the power train circuitry 120 is in the first state relative to a total time period. As discussed above, this duty cycle can be expressed as a variable between 0 and 1, with a 0 indicating that the power train circuitry remains in the second state (low switch 122 conducting, for an output voltage of roughly the reference potential [e.g. ground]) for the entire period and a 1 indicating that the power train circuitry remains in the first state (high switch 121 conducting, for an output voltage $V_{OUT}$ of approximately the input voltage $V_{IN}$) for the entire period.

The power train 120 may include an inductor 123 and a capacitor 124 configured to filter a signal or voltage between the high switch 121 and the low switch 122 to create the output voltage $V_{OUT}$. However, example embodiments are not limited thereto, and may include fewer components or additional components to further filter or modify the output voltage $V_{OUT}$. In addition, the power train 120 may include a sense amplifier 125 configured to measure a voltage drop across the high switch 121 and output a sense voltage Vsense.

The control circuitry 130 may include clock circuitry 140, one shot circuitry 150, an error amplifier 160, a current source 170, AND gate 172, switch 174, adjustment current source 176, comparator 180 and switch control logic 190. These elements, combined with a first resistor 131, a second resistor 132, switch 133 and capacitor 134, may control a duty cycle of the high switch 121 and the low switch 122 in the power train 120.

For example, the error amplifier 160 may receive the output voltage $V_{OUT}$ and may use a resistor circuit, such as a first resistor 131 and a second resistor 132, to scale the output voltage $V_{OUT}$. The scaled voltage may be coupled to the negative terminal of the error amplifier 160 so that the error amplifier 160 may compare the scaled voltage to a voltage reference $V_{REF}$ coupled to the positive terminal of the error amplifier 160. The error amplifier 160 may output a signal to the comparator 180 to modify the duty cycle of a pulse generated by the comparator 180. For example, if the scaled voltage is greater than the reference voltage $V_{REF}$, the pulse generated by the comparator 180 may become narrower, whereas if the scaled voltage is lower than the reference voltage $V_{REF}$, the pulse generated by the comparator 180 may become wider.

The current source 170 may generate a steady current to charge the capacitor 134 to create a ramp voltage Vramp at the negative terminal of the comparator 180. Once per clock cycle, the clock circuitry 140 and the one shot circuitry 150 may close the switch 133 to reset the ramp voltage Vramp. The comparator 180 may compare the output of the error amplifier 160 to the ramp voltage Vramp and output to the switch control logic 190, which may send a signal high SH to the high switch 121 and a signal low SL to the low switch 122. Thus, a duty cycle of the power train 120 may be based on the amount of current used to charge the capacitor 134 and create the ramp voltage Vramp.

A voltage transfer function for the power train 120 may be given by the expression $V_{OUT}=D*V_{IN}$, where D is the variable between 0 and 1 representing the duty cycle of the power train 120. In a system where the input voltage $V_{IN}$ can step between two fixed values while the output voltage $V_{OUT}$ is intended to remain fixed, the value of D may generate a corresponding adjustment between the two fixed values. For example, if the input voltage $V_{IN}$ can be the supply voltage Vsupply or the pump voltage Vpump, the value of D may be proportional in order to maintain the target value of $V_{OUT}$. Thus, a first duty cycle corresponding to the supply voltage Vsupply would be about twice a second duty cycle corresponding to the pump voltage Vpump if the pump voltage Vpump is twice the supply voltage Vsupply.

To avoid distortion in the output voltage $V_{OUT}$, the duty cycle may be halved or doubled at a transition from 1X mode to 2X mode. For example, as the input voltage $V_{IN}$ changes from 1X mode to 2X mode, the first duty cycle may be halved to the second duty cycle without substantial delay. To change the duty cycle quickly, the current source 170 may be configured to generate a first current during 1X mode and a second current during 2X mode, the second current being twice the first current. Therefore, a slope of the ramp voltage Vramp at the capacitor 134 will change from a first slope during the 1X mode to a second slope during the 2X mode, resulting in the appropriate duty cycle for each mode.

The switch control logic 190 may receive the output generated by the comparator 180 and may control the high switch 121 and the low switch 122 in the power train 120 accordingly. For example, if the pulse generated by the comparator 180 is a high signal, the switch control logic 190 may generate a high signal to the high switch 121 and a low signal to the low switch 122, thus closing the high switch 121 to couple the input voltage $V_{IN}$ to the output voltage $V_{OUT}$ while opening the low switch 122. However, if the pulse generated by the comparator 180 is a low signal, the switch control logic 190 may generate a low signal to the high switch 121 and a high signal to the low switch 122, thus opening the high switch 121 and closing the low switch 122 to couple the output voltage $V_{OUT}$ to the reference potential (e.g. ground).

Voltage Drops and Droop Voltage

Due to switching losses and charging conditions, the input voltage $V_{IN}$ may not exactly match the supply voltage Vsupply in the 1X mode or the pump voltage Vpump in the 2X mode. In addition, the pump voltage Vpump may not be exactly twice the supply voltage Vsupply. For example, as switches are generally comprised of metal-oxide semiconductor field-effect transistors (MOSFETs), they exhibit finite Rds-on values that will cause the voltage across the switch to vary from its intended value as a function of variables such as inductor current, semiconductor processing variations, temperature and the number of switches through which the current is passing at any given time. The voltage drop across a switch is calculated using V=I*Rds-on, where I is the current through the switch and Rds-on is the drain to source resistance of the switch during conduction or when the switch is "on."

Therefore, the input voltage $V_{IN}$ in the 1X mode may be the supply voltage Vsupply less an induced voltage drop across switch S5 (e.g., $V_{IN}(1X)$=Vsupply-$V_{S5}$). Similarly, a voltage across the first capacitor C1 may be the supply voltage Vsupply less an induced voltage drop across switch S3 and/or S1 (e.g., $V_{C1}$=Vsupply-$V_{S1}$-$V_{S3}$), and the pump voltage Vpump may be the supply voltage Vsupply plus the voltage across the first capacitor, less an induced voltage drop across switch S2 and/or switch S4 (e.g., Vpump=Vsupply+$V_{C1}$-$V_{S2}$-$V_{S4}$).

To account for any number of switches in the boost circuitry 110, a difference between the pump voltage Vpump and twice the supply voltage Vsupply may be labeled droop voltage $V_{DROOP}$ (e.g., Vpump=2*Vsupply-$V_{DROOP}$). The droop voltage $V_{DROOP}$ may include voltage drops across switches S1, S2, S3 and S4, along with any incomplete charging of the first capacitor C1 and/or the second capacitor C2 due to load conditions or switching speeds. For example, the droop voltage $V_{DROOP}$ may be due to incomplete charging of the second capacitor C2 caused by the voltage drops across switch S1 and switch S3 when the first capacitor C1 is charging and voltage drops across switch S2 and switch S4 when the second capacitor C2 is charging, plus any droop experienced by the second capacitor C2 as it delivers charge to the load during its non-charging portion of the clock cycle. Therefore, the input voltage $V_{IN}$ in the 2X mode may be the pump voltage Vpump less an induced voltage drop across switch S6, or twice the supply voltage Vsupply less the droop voltage $V_{DROOP}$ and the voltage drop across switch S6 (e.g., $V_{IN}(2X)$=Vpump-$V_{S6}$=2*Vsupply-$V_{S6}$-$V_{DROOP}$).

Moreover, under non-zero load current conditions, an output current $I_{OUT}$ through the high switch 121 and either switch S5 (in 1X mode) and switch S6 (in 2X mode) will impact the input voltage $V_{IN}$. The greater the output current $I_{OUT}$, the more the input voltage $V_{IN}$ sags as the voltage drop across switch S5 or switch S6 increases. The more the input voltage $V_{IN}$ sags, the less proportional the 1X input voltage $V_{IN(1X)}$ is to the 2X input voltage $V_{IN(2X)}$. For example, assuming Rds-on is the same between switch S5 and switch S6 and where $I_{OUT}$ is the output current, the input voltage $V_{IN(1X,2X)}$ is:

$$V_{IN}(1X)=Vsupply-Rds\text{-on}*I_{OUT}$$

$$V_{IN}(2X)=Vpump-Rds\text{-on}*I_{OUT}=2*Vsupply-V_{DROOP}-Rds\text{-on}*I_{OUT}$$

Taking into account an additional voltage drop of Rds-on*$I_{OUT}$ across the high switch 121, the actual steady state values required for the duty cycle D(1X, 2X) in the two modes are:

$$D(1X)=V_{OUT}/(V_{IN}(1X)-Rds\text{-on}*I_{OUT})$$

$$D(2X)=V_{OUT}/(V_{IN}(2X)-Rds\text{-on}*I_{OUT})$$

It can be seen from these equations that if the voltage drops across switch S5, switch S6 and the high switch 121 and the droop voltage $V_{DROOP}$ were zero, the exact factor-of-two change in the duty cycle D made by the current source 170 doubling the slope of the voltage ramp Vramp at a transition between 1X mode and 2X mode would result in no distortion or disturbances at the output voltage $V_{OUT}$. Similarly, if the droop voltage $V_{DROOP}$ and the voltage drops across switch S6 and the high switch 121 were exactly twice the voltage drops across switch S5 and the high switch 121, the exact factor-of-two change in the duty cycle would result in no distortion as well. However, the droop voltage $V_{DROOP}$ and the voltage drops in the 1X mode and 2X mode are not zero, so a distortion or disturbance is caused in the output voltage $V_{OUT}$. For example, the droop voltage $V_{DROOP}$ and the voltage drops across switch S6 and the high switch 121 are typically more than twice the voltage drops across switch S5 and the high switch 121, causing a distortion or disturbance in the output voltage $V_{OUT}$.

Transitioning Between Duty Cycles

As discussed above, the current source 170 may be configured to generate a fixed first current during 1X mode and a fixed second current during 2X mode, the second current being twice the first current. Therefore, a slope of the ramp voltage Vramp at the capacitor 134 will change from a first slope during the 1X mode to a second slope during the 2X mode. The comparator 180 may compare the ramp voltage Vramp to the error voltage Verr to generate a duty cycle for the high switch 121 and low switch 122 in the power train 120. The first current will generate an ideal (e.g., desired) first duty cycle and the second current will generate an ideal (e.g., desired) second duty cycle. However, due at least in part to the droop voltage $V_{DROOP}$ at the input voltage $V_{IN}$ in the 2X mode, an actual output voltage $V_{OUT}$ generated using the ideal second duty cycle may not be equal to the ideal (e.g., desired) output voltage. Therefore, an actual second duty cycle may need to increase above the ideal second duty cycle in order to generate the ideal output voltage. As the comparator 180 generates the actual second duty cycle by comparing the error voltage Verr to the ramp voltage Vramp, the actual second duty cycle may be increased by changes to the error voltage Verr or the ramp voltage Vramp.

If the ramp voltage Vramp is fixed by the second current, which is based on the ideal second duty cycle, the control logic 130 is configured to increase the actual second duty cycle using the error voltage Verr. For example, the actual output voltage $V_{OUT}$ using the ideal second duty cycle will be lower than the ideal output voltage due to the droop voltage $V_{DROOP}$ at the input voltage $V_{IN}$. Thus, the error amplifier 160 may compare the actual output voltage $V_{OUT}$ to a reference voltage $V_{REF}$ (the ideal output voltage) and generate the error voltage Verr. As the error voltage Verr increases relative to the ramp voltage Vramp, the duty cycle increases because the error voltage Verr exceeds the ramp voltage Vramp for a longer period of time during each clock cycle. However, a second error voltage Verr2 used to generate the actual second duty cycle based on the second current may be different from a first error voltage Verr1 used to generate the actual first duty cycle based on the first current. Thus, the buck regulator 100 may need to continually adjust the error voltage Verr between the first error voltage Verr1 and the second error voltage Verr2 when transitioning between the 1X mode and the 2X mode. The transition from the first error voltage Verr1 to the second error voltage Verr2 and back may cause distortion or disturbances at the output voltage $V_{OUT}$.

Figure 2A:
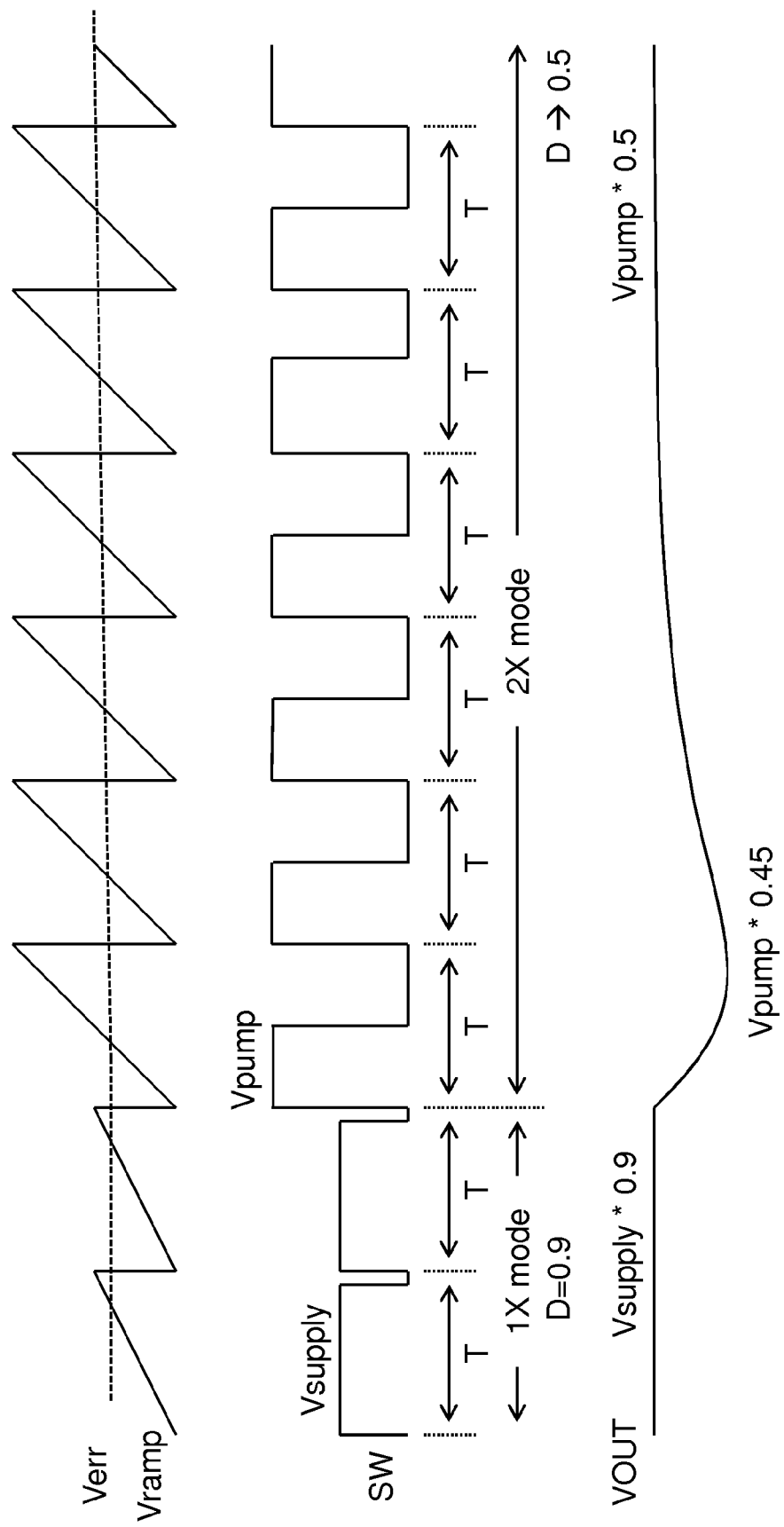
FIG. 2a is an example of voltage waveforms according to the example embodiments illustrated in FIG. 1.

For example, FIG. 2a illustrates a transition from the first error voltage Verr1 in 1X mode to the second error voltage Verr2 in 2X mode and the ensuing distortion on the output voltage $V_{OUT}$ as the ideal second duty cycle transitions to the actual second duty cycle. In the example illustrated in FIG.

2*a*, the supply voltage Vsupply is half the pump voltage Vpump, so the ideal second duty cycle should be half the first duty cycle.

Figure 2B:
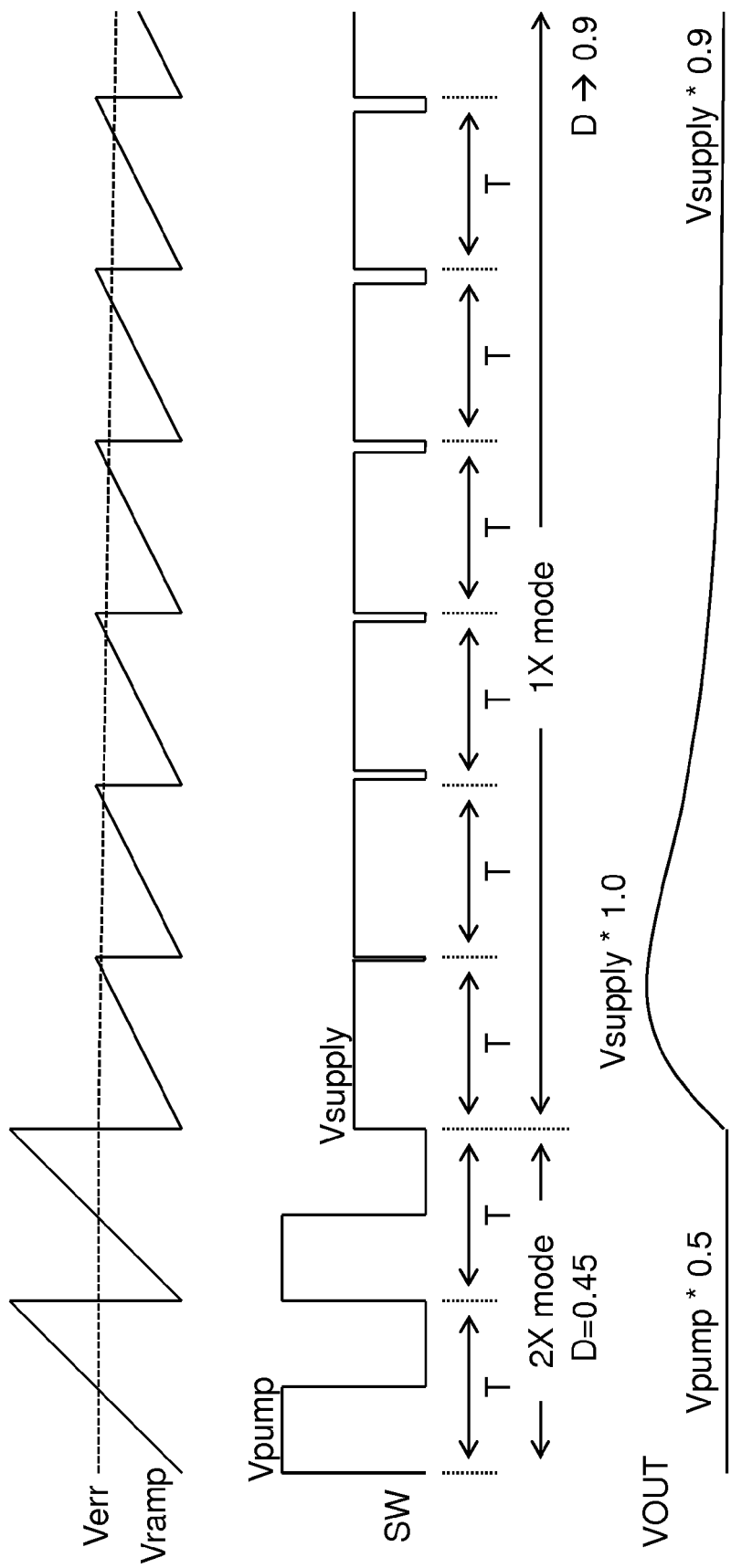
FIG. 2b is another example of voltage waveforms according to the example embodiments illustrated in FIG. 1.

However, due to the droop voltage $V_{DROOP}$, the actual second duty cycle required to maintain the output voltage $V_{OUT}$ is higher than the ideal second duty cycle. Therefore, the ideal second duty cycle (in this example, ideal D(2X)=0.45) causes a drop in the output voltage $V_{OUT}$ and the error voltage Verr increases to the actual second duty cycle (in this example, actual D(2X)=0.5). Thus, the second error voltage Verr2 is higher than the first error voltage Verr1, causing the output voltage $V_{OUT}$ to undershoot due to the decreased duty cycle. FIG. 2*b* is an example of a transition from the second error voltage Verr2 in 2X mode to the first error voltage Verr1 in 1X mode and shows the output voltage $V_{OUT}$ overshooting due to the increased duty cycle. As illustrated in FIGS. 2*a* and 2*b*, any transition between an ideal duty cycle and an actual duty cycle causes an overshoot or undershoot in the output voltage $V_{OUT}$. Likewise, a slow transition between the first duty cycle and the second duty cycle would cause a similar overshoot or undershoot in the output voltage $V_{OUT}$.

To avoid potential distortion in the output voltage $V_{OUT}$ when transitioning between the 1X mode and the 2X mode, the buck regulator 100 may instead modify the ramp voltage Vramp to increase the actual second duty cycle and generate the ideal output voltage in the 2X mode. Modifying the ramp voltage Vramp in the 2X mode may avoid adjustments to the error voltage Verr between the 2X mode and the 1X mode.

For example, the sense amplifier 125 may measure a voltage drop across the high switch 121 and the adjustment current source 176 may use the measured voltage drop to generate an adjustment current. The adjustment current may be drawn out of the ramp voltage Vramp in the 2X mode in order to slightly decrease a slope of the ramp voltage Vramp and therefore increase the second duty cycle. By adjusting the second duty cycle with the adjustment current, the buck regulator 100 may generate the required output voltage $V_{OUT}$ without varying the error voltage Verr between the 2X mode and the 1X mode.

Figure 3:
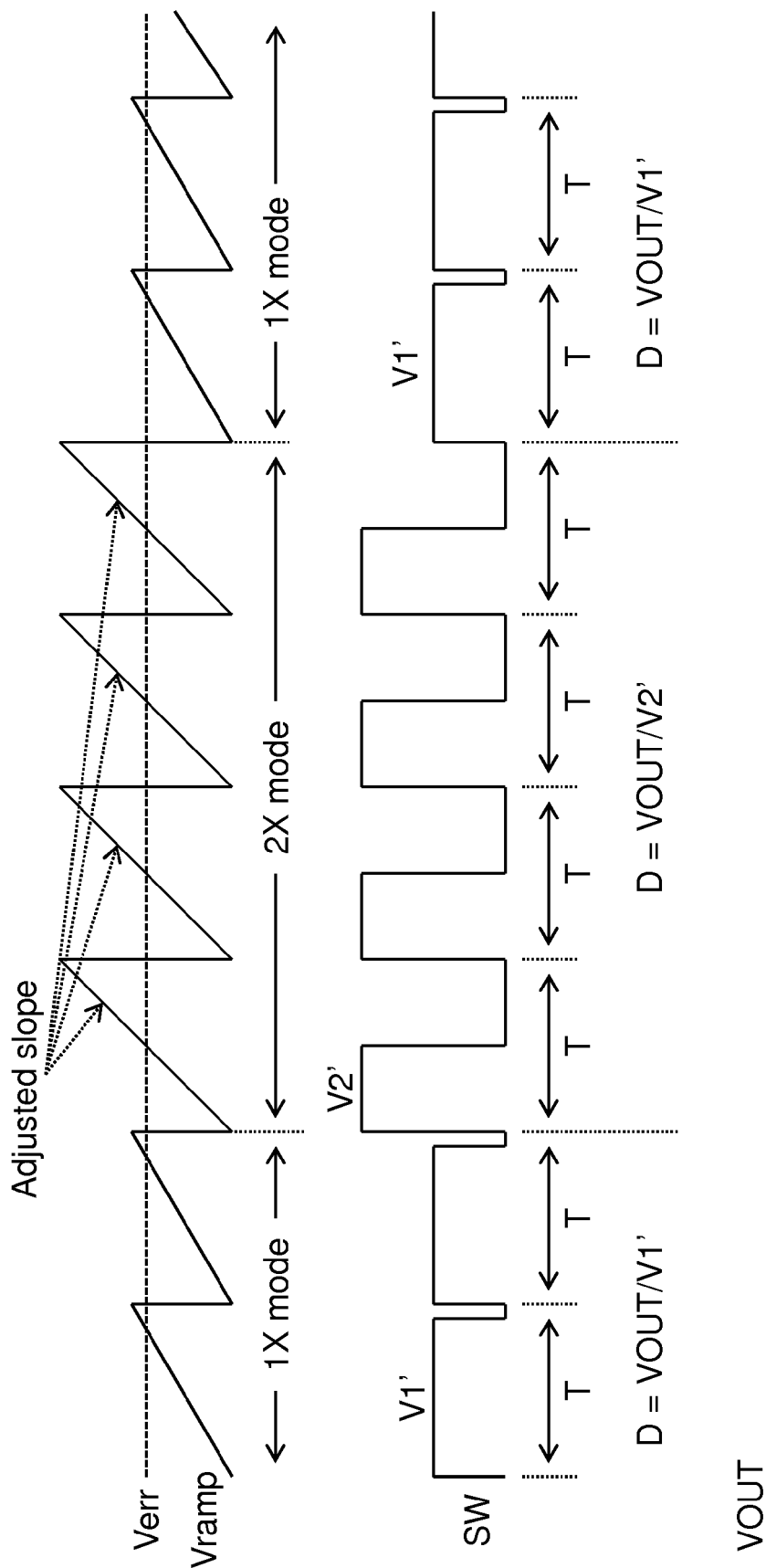
FIG. 3 is another example of voltage waveforms according to the example embodiments illustrated in FIG. 1.

FIG. 3 illustrates the voltage ramp Vramp exhibiting an adjusted slope in the 2X mode so that the error voltage Verr is constant between the 1X mode and the 2X mode. Thus, the duty cycle changes instantly from the first duty cycle shown in 1X mode and the second duty cycle shown in 2X mode without a period of transition. Therefore, the output voltage $V_{OUT}$ remains constant, with reduced distortion or disturbances.

As the adjustment current source is based on the actual voltage drop across the high switch 121, the adjustment current may be proportional to the actual voltage drops across each of the switches during conduction, which beneficially includes process, temperature, and instantaneous load current-dependent contributions.

The control logic 130 may include the AND gate 172 and the switch 174 so that the adjustment current is only drawn out of the ramp voltage Vramp during the 2X mode. For example, the AND gate 172 may only output a high signal if the signal from the inverter 106 and the signal high from the switch control logic 190 are both high. The switch 174 may be configured to close or conduct only if the AND gate 172 outputs the high signal. Therefore, the adjustment current source has no effect on the ramp voltage Vramp if the signal to the high switch 121 is low or the signal from the inverter 106 is low. Thus, the adjustment current is only drawn out of the ramp voltage Vramp during conduction of the high switch 121 while in the 2X mode. However, example embodiments are not limited thereto, and the adjustment current may be drawn out of the ramp voltage Vramp at any time.

Figure 4:
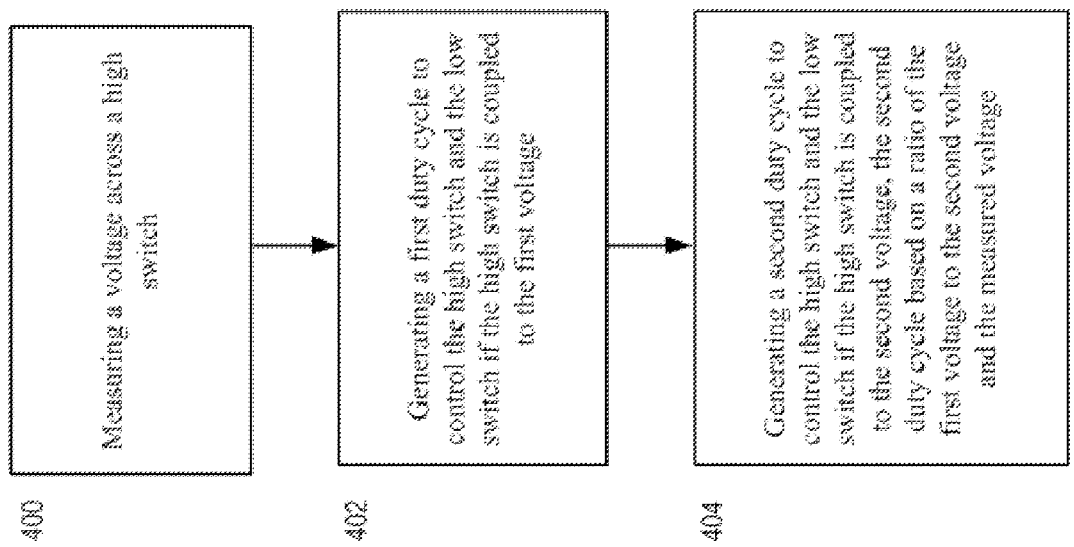
FIG. 4 illustrates a flowchart of operations according to some example embodiments of the present disclosure.

FIG. 4 illustrates a flowchart of operations consistent with one example embodiments of the present disclosure. At operation 400, the buck regulator 100 measures a voltage across the high switch 121. At operation 402, the buck regulator 100 generates a first duty cycle to control the high switch 121 and the low switch 122 if the high switch 121 is coupled to the first voltage (e.g., supply voltage Vsupply). At operation 404, the buck regulator 100 generates a second duty cycle to control the high switch 121 and the low switch 122 if the high switch 121 is coupled to the second voltage (e.g., pump voltage Vpump), the second duty cycle based on a ratio of the first voltage (e.g., supply voltage Vsupply) to the second voltage (e.g., pump voltage Vpump) and the voltage measured in operation 400.

Note that numerous variations on the topology illustrated herein may be made without departing from the core concept of the invention, which is controlled adjustment of the duty cycle as the buck regulator steps between different input voltage $V_{IN}$ operating modes in a way that beneficially compensates for inaccuracies due to instantaneous voltage drops across the system's switches, thereby avoiding disturbances in the output voltage $V_{OUT}$. For example, the scaling factor for the input voltage $V_{IN}$ need not be limited to 1X and 2X, and could instead include 3X or other multiples. Additionally, more than two scaling factors (and therefore multiple modes) could conceivably be employed, and also need not be restricted to integer values. The boost circuitry 110 could be constructed using any of numerous other possible configurations. Also, the source for the input voltage $V_{IN}$ is not limited to charge pump topology. Likewise, the power train 120 is not necessarily limited to a buck regulator topology, but could be some other form of switching regulator design. The general topology of the system also need not be restricted to using a fixed frequency clock, but could use a variable clock or hysteretic control.

"Circuitry", as used in any embodiment herein, may comprise, for example, singly or in any combination, hardwired circuitry, programmable circuitry, state machine circuitry, and/or firmware that stores instructions executed by programmable circuitry. The circuitry may be embodied as an integrated circuit, such as an integrated circuit chip.

Thus, the present disclosure provides systems, devices, and methods for converting and regulating an output voltage of a voltage converter during a transition from a first mode, wherein the output voltage is equal to a supply voltage, and a second mode, wherein the output voltage is a multiple of the supply voltage. The following examples pertain to further embodiments.

In one embodiment, there is provided a voltage regulating device. The device of this example may include voltage supply circuitry configured to receive a first voltage, generate at least a second voltage based on the first voltage, and output an output voltage, the output voltage being one of the first voltage and the second voltage based on a voltage selection signal. The device of this example may also include regulator circuitry configured to switch between the output voltage and a reference potential based on a control signal. The device of this example may further include control circuitry configured to generate the control signal, the control signal having a first duty cycle if the output voltage is the first voltage and a second duty cycle if the output voltage is the second voltage, the control circuitry configured to adjust the second duty cycle based on, at least in part, a droop voltage in the regulator circuitry.

In another embodiment, there is provided a voltage regulating device. The device of this example may include regulator circuitry comprising a low switch coupled to a reference potential and a high switch coupled to one of at least a first voltage and a second voltage. The device of this example my also include control circuitry configured to control the regulator circuitry to generate a regulated output voltage, and further configured to generate a first duty cycle for the regulator circuitry if the regulator circuitry is coupled to the first voltage and to generate a second duty cycle for the regulator circuitry if the regulator circuitry is coupled to the second voltage, wherein the second duty cycle is based on a voltage across the high switch and a ratio of the first duty cycle to the second duty cycle.

In yet another embodiment there is provided a method for voltage regulation. The method of this example may include measuring a voltage across a high switch, the high switch in series with a low switch and coupled to one of at least a first voltage and a second voltage, the low switch coupled to a reference potential, the output voltage coupled between the high switch and the low switch. The method of this example may also include generating a first duty cycle to control the high switch and the low switch if the high switch is coupled to the first voltage. The method of this example may further include generating a second duty cycle to control the high switch and the low switch if the high switch is coupled to the second voltage, the second duty cycle based on the measured voltage and a ratio of the first voltage to the second voltage.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A voltage regulating device, the device comprising:
   voltage supply circuitry configured to receive a first voltage, generate at least a second voltage based on the first voltage, and output one of the first voltage or the second voltage as an intermediate voltage based on a voltage selection signal;
   regulator circuitry configured to receive the intermediate voltage as an input voltage and generate an output voltage based at least on the intermediate voltage by switching between the intermediate voltage and a reference potential based on a control signal; and
   control circuitry configured to generate the control signal, the control signal having a first duty cycle if the intermediate voltage is the first voltage and a second duty cycle if the intermediate voltage is the second voltage, the control circuitry configured to adjust the second duty cycle based on, at least in part, a droop voltage in the regulator circuitry.

2. The device of claim 1, wherein the voltage supply circuitry comprises a charge pump configured to:
   receive the first voltage, a clock signal and the voltage selection signal, the voltage selection signal indicating one of at least a 1X mode and a 2X mode;
   output the first voltage as the intermediate voltage in the 1X mode;
   charge a first capacitor using the first voltage if the clock signal is a high signal;
   charge a second capacitor using the first capacitor in series with the first voltage if the clock signal is a low signal, a voltage across the second capacitor being the second voltage; and
   output the second voltage as the intermediate voltage in the 2X mode.

3. The device of claim 2, wherein the charge pump is configured to output a third voltage as the intermediate voltage if the voltage selection signal indicates a 3X mode.

4. The device of claim 1, wherein the regulator circuitry comprises:
   a high transistor coupled to the intermediate voltage, the high transistor configured to conduct based on the control signal;
   a low transistor coupled between the high transistor and the reference potential, the low transistor configured to conduct based on the control signal; and
   filter circuitry coupled to a node between the high transistor and the low transistor, the filter circuitry configured to filter a regulator voltage on the node.

5. The device of claim 4, wherein the filter circuitry includes an inductor coupled between the node and an output of the device and a capacitor coupled between the output of the device and the reference potential.

6. The device of claim 1, wherein the control circuitry further comprises:
   sensing circuitry configured to measure a voltage drop across a high transistor in the regulator circuitry if the high transistor is conducting.

7. The device of claim 6, wherein the control circuitry further comprises:
   an adjustment current source configured to generate an adjustment current based on the voltage drop measured by the sensing circuitry.

8. The device of claim 7, wherein the control circuitry further comprises:
   a ramp current source configured to generate a ramp current based on the voltage selection signal, the ramp current being a first current having a slope proportional to the first voltage if the intermediate voltage is the first voltage and a second current having a slope proportional to the second voltage if the intermediate voltage is the second voltage;
   a ramp capacitor configured to charge based on the ramp current; and
   switch control circuitry configured to compare a voltage of the ramp capacitor an error voltage to determine a duty cycle of the control signal, wherein the adjustment current is drawn out of the ramp capacitor.

9. The device of claim 8, wherein the adjustment current is drawn out of the ramp capacitor only if the intermediate voltage is the second voltage.

10. The device of claim 8, wherein the adjustment current source is configured to only generate the adjustment current if the intermediate voltage is the second voltage.

11. The device of claim 8, wherein the control circuitry further comprises clock circuitry configured to discharge the ramp capacitor based on a clock signal.

12. The device of claim 8, wherein the control circuitry further comprises an error amplifier configured to compare the output voltage to a reference voltage to generate the error voltage.

13. A voltage regulating device, the device comprising:
regulator circuitry comprising a low switch coupled to a reference potential and a high switch coupled to one of at least a first voltage and a second voltage; and
control circuitry configured to control the regulator circuitry to generate a regulated output voltage, and further configured to generate a first duty cycle for the regulator circuitry if the regulator circuitry is coupled to the first voltage and to generate a second duty cycle for the regulator circuitry if the regulator circuitry is coupled to the second voltage, wherein the second duty cycle is based on a voltage across the high switch and a ratio of the first duty cycle to the second duty cycle;
wherein the ratio of the first duty cycle to the second duty cycle is inversely proportional to a ratio of the first voltage to the second voltage less the voltage across the high switch.

14. The device of claim 13, wherein the control circuitry further comprises an adjustment current source configured to generate an adjustment current based on the voltage drop measured by the sensing circuitry.

15. The device of claim 14, wherein the control circuitry further comprises:
a ramp current source configured to generate a ramp current based on the voltage selection signal, the ramp current being a first current having a slope proportional to the first voltage if the output voltage is the first voltage and a second current having a slope proportional to the second voltage if the output voltage is the second voltage;
a ramp capacitor configured to charge based on the ramp current; and
switch control circuitry configured to compare a voltage of the ramp capacitor to a desired voltage to determine a duty cycle of the control signal, wherein the adjustment current is drawn out of the ramp capacitor.

16. The device of claim 15, wherein the adjustment current is drawn out of the ramp capacitor only if the output voltage is the second voltage.

17. A method of regulating an output voltage, the method comprising: measuring a voltage across a high switch, the high switch in series with a low switch and
coupled to one of at least a first voltage and a second voltage, the low switch coupled to a reference potential, the output voltage coupled between the high switch and the low switch;
generating a first duty cycle to control the high switch and the low switch if the high switch is coupled to the first voltage; and
generating a second duty cycle to control the high switch and the low switch if the high switch is coupled to the second voltage, the second duty cycle based on the measured voltage and a ratio of the first voltage to the second voltage;
wherein a ratio of the first duty cycle to the second duty cycle is inversely proportional to the ratio of the first voltage to the second voltage less the measured voltage across the high switch.

18. The method of claim 17, wherein the generating of the second duty cycle further comprises:
generating a first current using a first current source if the high switch is coupled to the second voltage;
charging a capacitor using the first current;
generating a second current using a second current source, the second current based on the measured voltage across the high switch; and
discharging the capacitor using the second current.

* * * * *